United States Patent
Hammond

(10) Patent No.: US 7,139,755 B2
(45) Date of Patent: Nov. 21, 2006

(54) METHOD AND APPARATUS FOR PROVIDING COMPREHENSIVE SEARCH RESULTS IN RESPONSE TO USER QUERIES ENTERED OVER A COMPUTER NETWORK

(75) Inventor: Joel K. Hammond, Willingboro, NJ (US)

(73) Assignee: Thomson Scientific Inc., Stamford, CT (US)

( * ) Notice: Subject to any disclaimer, the term of this patent is extended or adjusted under 35 U.S.C. 154(b) by 329 days.

(21) Appl. No.: 09/992,979

(22) Filed: Nov. 6, 2001

(65) Prior Publication Data

US 2003/0088547 A1 May 8, 2003

(51) Int. Cl.
G06F 7/00 (2006.01)
G06F 17/30 (2006.01)

(52) U.S. Cl. ............... 707/5; 707/4; 707/10; 707/104.1
(58) Field of Classification Search .................... 707/3, 707/5, 2, 10, 4, 104.1
See application file for complete search history.

(56) References Cited

U.S. PATENT DOCUMENTS

| | | | |
|---|---|---|---|
| 4,754,489 A | 6/1988 | Bokser | |
| 4,814,746 A | 3/1989 | Miller | |
| 4,876,731 A | 10/1989 | Loris et al. | |
| 5,062,143 A | 10/1991 | Schmitt | |
| 5,075,896 A | 12/1991 | Wilcox | |
| 5,151,950 A | 9/1992 | Hullender | |
| 5,625,767 A | 4/1997 | Bartell et al. | |
| 5,640,553 A * | 6/1997 | Schultz ........................... | 707/5 |
| 5,703,964 A | 12/1997 | Menon et al. | |
| 5,724,575 A | 3/1998 | Hoover et al. .............. | 395/610 |
| 5,751,850 A | 5/1998 | Rindtorff | |
| 5,818,952 A | 10/1998 | Takenouchi et al. | |
| 5,873,076 A * | 2/1999 | Barr et al. ...................... | 707/3 |
| 5,970,490 A | 10/1999 | Morgenstern ................. | 707/10 |
| 5,983,214 A | 11/1999 | Lang et al. .................... | 701/1 |
| 5,983,216 A | 11/1999 | Kirsch et al. .................. | 707/2 |
| 5,987,454 A | 11/1999 | Hobbs ........................... | 707/4 |
| 6,012,053 A | 1/2000 | Pant et al. ..................... | 707/3 |
| 6,018,733 A | 1/2000 | Kirsch et al. .................. | 707/3 |
| 6,029,161 A | 2/2000 | Lang et al. .................... | 707/1 |
| 6,070,158 A | 5/2000 | Kirsch et al. .................. | 707/3 |
| 6,112,203 A | 8/2000 | Bharat et al. .................. | 707/5 |

(Continued)

OTHER PUBLICATIONS

"INFOMINE: Query Results" (14 pgs.) accessed from http://infomine.ucr.edu/cgi-bin/canned_search on Jul. 9, 2001.

(Continued)

Primary Examiner—Greta L. Robinson
Assistant Examiner—Kuen S. Lu
(74) Attorney, Agent, or Firm—Schwegman, Lundberg, Woessner and Kluth P.A.

(57) ABSTRACT

A system and methods for providing users with comprehensive search results in response to queries entered by the user over a computer network. The user may access the network and enter a query in order to obtain information related to the query. The network is associated with a plurality of electronic files and a metadata database for accessing the files. The key terms of the query will be identified and may be expanded to include additional terms that have been previously identified as related to the key terms entered by the user. The expanded query is used to provide the user with information that contains or is identified by terms that may or may not be included in the query entered by the user, but nevertheless is relevant thereto.

52 Claims, 8 Drawing Sheets

U.S. PATENT DOCUMENTS

| | | | |
|---|---|---|---|
| 6,137,911 A | 10/2000 | Zhilyaev | |
| 6,226,632 B1 | 5/2001 | Takahashi et al. | 707/3 |
| 6,249,784 B1* | 6/2001 | Macke et al. | 707/3 |
| 6,253,239 B1 | 6/2001 | Shklar et al. | 709/217 |
| 6,393,415 B1* | 5/2002 | Getchius et al. | 707/2 |
| 6,460,029 B1* | 10/2002 | Fries et al. | 707/3 |
| 6,523,022 B1* | 2/2003 | Hobbs | 707/3 |
| 2002/0052871 A1* | 5/2002 | Chang et al. | 707/3 |
| 2002/0078230 A1* | 6/2002 | Hals et al. | 709/238 |

OTHER PUBLICATIONS

"INFOMINE: Resource Details" (2 pgs.) accessed from http:/infomine.ucr.edu/cgi-bin/canned_serch on Jul. 9, 2001.

"INFOMINE: Promising Directions in Virtual Liberty Development" (10 pgs.) by Julie Mason, Steve Mitchell, Margaret Mooney, Lynne Reasoner and Carlos Rodriquez; May 30, 2001.

"Hypersearching the Web" (9 pgs.) accessed from http:/www.sciam.com/1999/0699issue/0699raghavan.html on May 30, 2001.

"Excite Search Results for 'protein'" (2 pgs.) accessed from http://search.excite.com/search on Jul. 9, 2001.

AltaVista—The Search Company Homepage, http://web.archive.org/web/20011031190455/http://www.altavista.com/, (Oct. 31, 2001), 2 pgs.

Northern Light Power Search, http://web.archive.org/web/20001018000000-20001018235959/http://www.northernlight.com, (Oct. 18, 2000), 5 pgs.

Westlaw Sign-On, http://web.archive.org/web/20001018-re/http://www.westlaw.com, (Oct. 18, 2000), 2 pgs.

AltaVista—The Search Company, http://web.archive.org/web/20001017—re/http://www.altavista.com, (Oct. 17, 2000), 2 pgs.

Yahoo!, http://web.archive.org/web/20001027re/http:www.yahoo.com, (Oct. 27, 2000), 2 pgs.

Schatz, Bruce R., "Information Retrieval in Digital Libraries: Bringing Search to the Net", *Science*, 275 (Jan. 17, 1997), pp. 327-334.

* cited by examiner

FIG. 7

METHOD AND APPARATUS FOR PROVIDING COMPREHENSIVE SEARCH RESULTS IN RESPONSE TO USER QUERIES ENTERED OVER A COMPUTER NETWORK

FIELD OF THE INVENTION

The subject invention relates generally to a system and methods for providing a user with comprehensive search results in response to queries entered by the user over a computer network. The methods and system of the present invention include a computer network associated with a plurality of electronic files containing information and a metadata database comprising identifying data for selectively accessing the electronic files. A query entered by the user may be expanded to include related terms not entered by the user. The expanded query is used to provide the user with relevant information that contains or is identified by terms that may or may not be included in the query entered by the user.

BACKGROUND OF THE INVENTION

Performing a search over the Internet or other networks in order to locate information relevant to the search terms entered by a user is quite often a laborious task. Typical search engines or other searchable databases enable users to search only the terms the user has entered. A few search engines and searchable databases will automatically search synonyms of the terms entered by the user. Others provide a list of related terms after a search is complete and the results are displayed, in order to enable a user to subsequently perform a further search on a related term. Searching for information in that manner may or may not provide useful results. Moreover, such searches rarely, if ever, provide a comprehensive set of search results including not only information relevant to the terms entered by the user but also information relevant to unentered terms wherein the entered and unentered terms are pre-determined to be related. The ability to automatically search and obtain information containing unentered terms related to the entered terms is helpful in providing comprehensive search results.

Providing the ability to automatically expand on key terms entered by a user as part of a query allows a search of accessible electronic files to return a comprehensive set of search results comprising relevant information that may have been missed had the query not been expanded. Expanding the query entered by a user to include related terms enables a user to obtain a comprehensive set of results limited only by the number of related terms associated with the terms contained in the query entered by the user.

SUMMARY OF THE INVENTION

In accordance with the present invention, there is provided a system and methods for enabling a user to obtain comprehensive search results in response to a query entered by the user over a computer network. The user may access a computer network and enter a query in order to obtain information related to the query. The computer network is associated with a plurality of electronic files containing information and a metadata database comprising identifying data for selectively accessing the electronic files. The query may be expanded to include terms related to those entered by the user and utilized to provide the user with electronic files that contain or are identified by terms that may or may not be included in the original query entered by the user.

In one embodiment of the present invention, there is provided a method of providing a user with comprehensive search results in response to queries entered by the user over a computer network. The method comprises the steps of:
 a) providing access to a computer network associated with a plurality of electronic files containing information and a metadata database comprising identifying data for selectively accessing the electronic files;
 b) prompting a user to enter a query;
 c) identifying key terms contained in the query;
 d) creating an expanded query to include additional terms pre-determined to be related to the key terms in the query;
 e) identifying information that includes at least one of the terms in the expanded query;
 f) prompting the user to select at least one item of information identified as including at least one of the terms in the expanded query; and
 g) accessing an electronic file that contains the information selected by the user.

In another embodiment of the present invention, there is provided a method of enabling a user using a computer network to obtain comprehensive search results. The method comprises the steps of:
 a) accessing a computer network associated with a plurality of electronic files containing information and a metadata database comprising identifying data for selectively accessing the electronic files;
 b) identifying key terms contained in a query entered by a user over the computer network;
 c) creating an expanded query to include additional terms associated with the key terms;
 d) identifying information identified by at least one of the terms in the expanded query;
 e) enabling the user to select at least one item of information identified by at least one of the terms in the expanded query; and
 f) accessing an electronic file that contains the information selected by the user.

In still another embodiment of the present invention, there is provided a system for providing users with comprehensive search results in response to a query entered by the user. The system comprises:
 a) an electronically accessible computer network including at least one server for providing access to information that is available through the computer network; and
 b) the computer network being associated with
  a plurality of electronic files containing information;
  a metadata database for accessing the electronic files; and
  a vocabulary bridge for expanding a query entered by a user.

BRIEF DESCRIPTION OF THE DRAWINGS

For the purpose of illustrating the invention, there is shown in the drawings a form which is presently preferred; it being understood, however, that this invention is not limited to the precise arrangements and methodologies shown.

FIG. 7 is a page users may encounter while accessing the network once the user has selected a item of identified information, in accordance with an embodiment of the present invention.

DETAILED DESCRIPTION OF THE INVENTION

Figure 1:
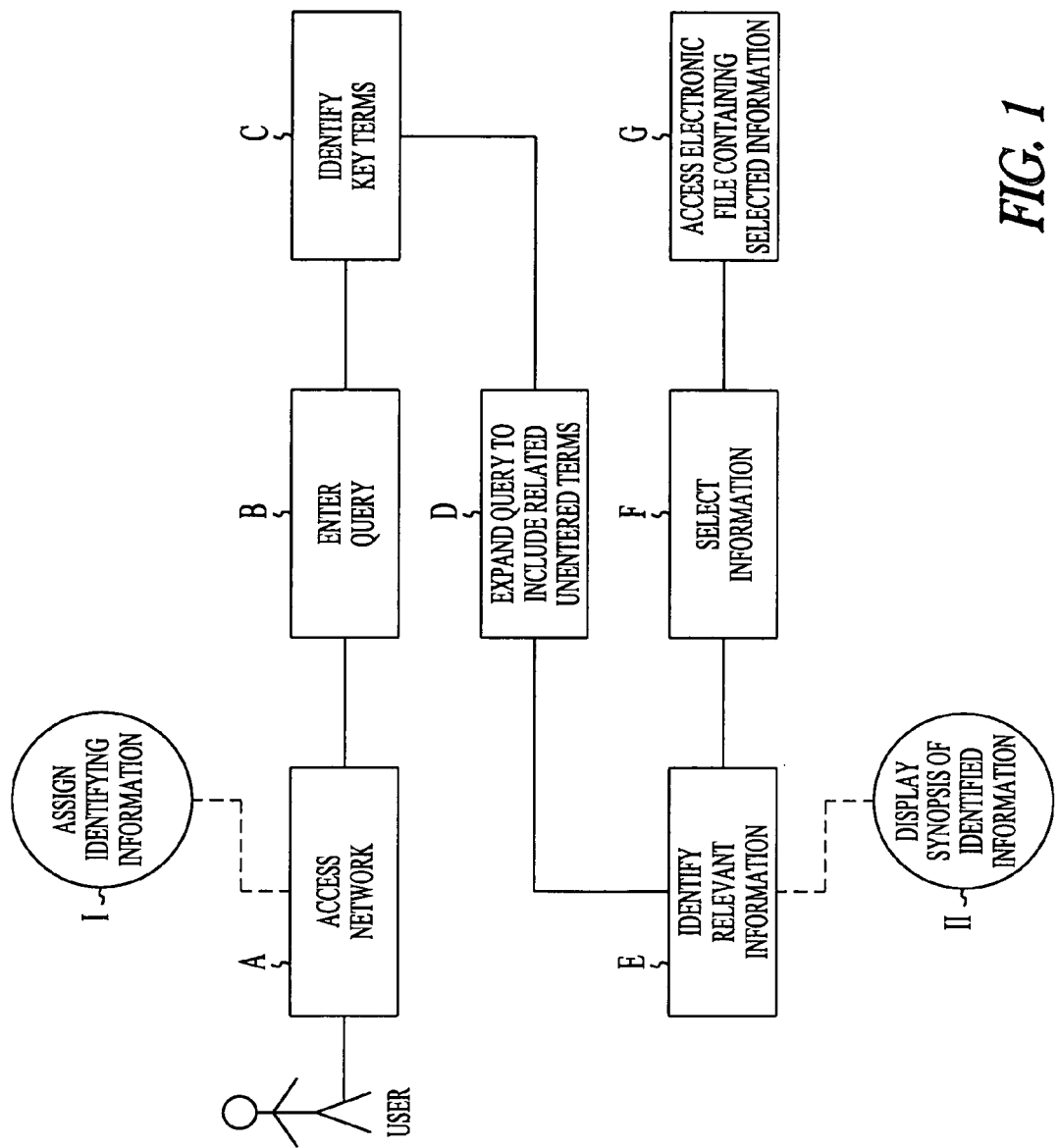
FIG. 1 is a flow chart showing method steps illustrating how a user may access a network and perform a search in order to obtain comprehensive search results, in accordance with an embodiment of the present invention.

Referring now to the Figures, there is shown in FIG. 1 one embodiment of a method for obtaining comprehensive search results according to the present invention. The various method steps are designated by a letter of the English alphabet. The basic steps of the method are in rectangles and are designated with upper case letters while the optional steps are in circles and are designated with Roman numerals. The terms "server" and "database" are used interchangeably to refer to a storage medium where users may access electronic files over a computer network.

In a preferred embodiment of the invention, the method is carried out over a network of interconnected computers, such as, but not limited to, an Intranet or the Internet. For the sake of convenience, the network may be referred to as the Internet. As an initial step, a user may access the network through a network node, such as a web site, method step A, by using any device capable of establishing a communication link with a computer network. The list of such devices is constantly growing. At present, users may access a computer network using various hand-held devices, television sets, cellular telephones and, of course, personal computers. That list of devices is not, by any means, meant to be an exhaustive list of devices that may be used with the present invention. Those devices are merely exemplary. Any device capable of connecting to a network or to the Internet is within the scope of the present invention. Furthermore, the network need not be publicly accessible. Instead, the network may be made available on a local or private computer network such as an Intranet. Where the network is available publicly, there may be a fee associated with accessing and/or using the network. Any network that facilitates the exchange of data between at least one central server or database and at least one network access device is within the scope of the present invention.

Upon accessing the network, the user may be prompted to enter identifying information, method step I, so that the network may recognize the user if they subsequently access the network to, for example, complete a partially-finished search. The network will assign the identifying information provided by a user to that user. The identifying information may be numbers, letters or a combination of the two. The network is adapted to compartmentalize and organize searches conducted by a particular user so that the user may conduct and subsequently access multiple searches. The various searches conducted by a user may be protected with a password or access code designated by the user and recorded by the network.

Once a user has accessed the network, the user may enter a query, method step B, in order to obtain information related to the subject of the query. In one embodiment, the query is entered in the form of a natural language search, such as, for example, "the global warming cholera outbreak." The query may also be entered in the form of a "terms and connectors" or Boolean search, such as is commonly used when searching databases.

When a query is entered by a user, the query may be resolved by a keyword resolver to parse out extraneous information and identify key terms. The identification of key terms is method step C. In the query shown above for example, the network would ignore the term "the" and instead focus on the terms "global warming cholera outbreak."

After the key terms of a query have been identified, the query is expanded to include terms related to the terms entered by the user, method step D. Terms added to the query as part of the expansion process are referred to as unentered terms and are terms that, despite not being entered by the user, are related to the terms entered by the user, and are thus helpful when conducting a comprehensive search. The unentered terms included in the expanded query may be related to the entered terms in an unlimited number of ways. Unentered terms may be, for example, a synonym of an entered term or a term pre-determined to be related to an entered term such as, for example, the entered term's causative agent. In the latter case, a query entered by a user containing the term malaria may be expanded to include plasmodium falciparum, malaria's causative agent, in order to obtain comprehensive information pertaining to malaria. Such a query may also be expanded to include other afflictions that cause symptoms similar to those symptoms caused by malaria. The query may also be expanded so as to search for a biological sequence of malaria. Such biological sequence's may be, for example, deoxyribonucleic acid (DNA) sequences, ribonucleic acid (RNA) sequences and protein sequences.

Once a query has been expanded, the next step, method step E is to identify relevant information based on the expanded query. Relevant information may be identified in a number of ways in order to optimize the system's ability to reliably respond to user queries in light of both the user's and the system's requirements. In one embodiment, relevant information may be identified as the electronic files that include or contain a term, entered or unentered, of the expanded query. This embodiment may be used to obtain any type of electronic file containing any type of information but may especially be used to identify relevant text-based information. Relevant information may also be identified as the electronic files that are identified by a term, entered or entered, of the expanded query. In that case, for example, biological sequences may be retrieved without actually including the sequence in the expanded query. That is, the electronic file containing information containing the sequence may simply be identified by a particular term and if that term is included in an expanded query, the file containing the sequence will be retrieved. This embodiment may be used to obtain any type of electronic file containing any type of material and has particular utility with non-text based information in that the information may be tagged with any type of identifier. For example, information such as an audio file containing a recording of a meeting or conference pertaining to a relevant topic may be tagged with, and thereby identified by, terms used in or representative of the topics discussed at the meeting. Information contained in text-based files may also be tagged with an identifier as desired to improve the search and retrieval process.

As an option, illustrated in method step II, a brief synopsis may be provided for each item of information identified by the system as including information relevant to the user's query, in order to provide further assistance in enabling a user to obtain particularly relevant results. The synopsis may be authored by a party other than the author or provider of a specific item of information. The synopsis may be in the form of a critique, an abstract, or any other message that provides additional details concerning the content of the information. The synopsis may also include details regarding the reliability of the source of the information as well as the validity or level of acceptance of any conclusions contained therein. The synopsis may be delivered in a text format, an audio format, or any other appropriate format, as desired.

Once a list of the relevant information has been identified and presented to the user, the user may be prompted to select from the list as desired, method step F. A selected item of information is then accessed and presented to the user as indicated in method step G.

The plurality of electronic files associated with the network of the present invention may be associated with the network and made available to users in any manner known to those skilled in the art. For example, in one embodiment, the electronic files may be stored locally in a database(s). The electronic files may also be stored in any number of remote databases, the contents of which may be accessed by way of an executable link located at the network's network node, web site, access page or other suitable interface. The electronic files associated with remote servers or remote databases may be accessed by a user through the use of executable links that provide access to various electronic files contained on various remote servers. The electronic files, regardless of whether they are available locally or remotely, may be any type of electronic file and may be in the form of data, text, audio, graphics, photographs, and the like. The electronic files may contain information concerning any number of bodies of information or they may be limited to a preselected body of information. Where more than one body of information is contained in the electronic files, such as for example, biology and civil engineering, the electronic files may be organized according to whether it relates to biology or civil engineering so that the user may chose which one to search. In a preferred embodiment of the present invention, a single subject matter of information preselected or chosen by the user is available for searching. Grouping or relating terms together where all the terms are being searched within the confines of a single body of information, such as biology, allows the terms to be related, and the query expanded, in the context of the body of information being searched.

Figure 2:
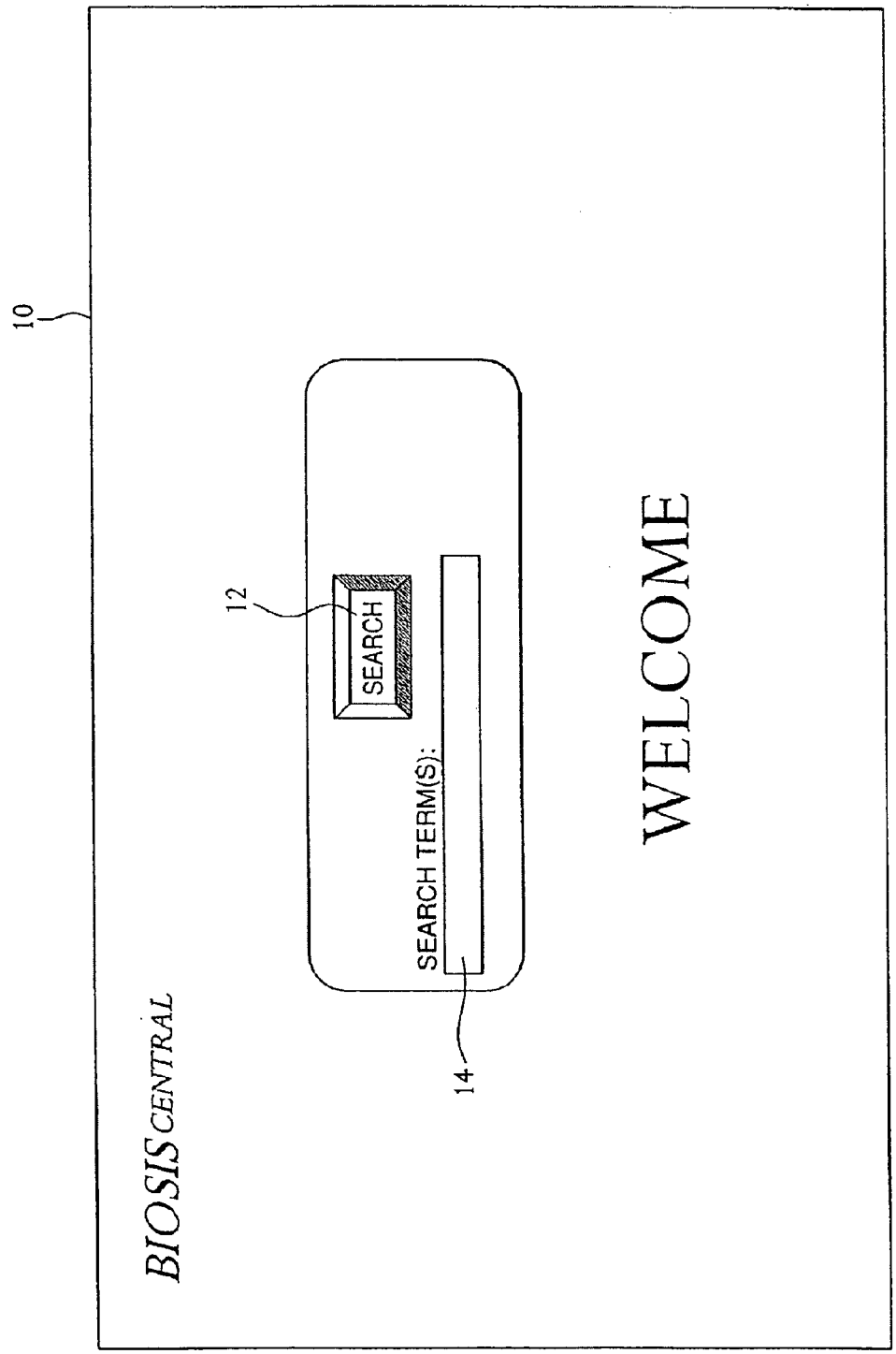
FIG. 2 is an access page that users may initially encounter when accessing the network, in accordance with the present invention.

By way of example, where the network is the Internet and the network node is a web site, a user may access the network by entering the web site's Internet address or Uniform Resource Locator (URL) into a web browser. Where the present invention is used in conjunction with an Intranet or private computer network, the network provider may provide an executable icon on the user's personal computer. The web browser or icon will electronically direct the user to the home page or access page of the network. An illustration of a home page or access page for use with an embodiment of the present invention is shown in FIG. 2. The home page 10, comprises an executable icon, or "button," 12 entitled, in one embodiment, "search," which may be executed after a user has entered a query. The user may enter a query in the space indicated with the reference numeral 14.

Figure 3:
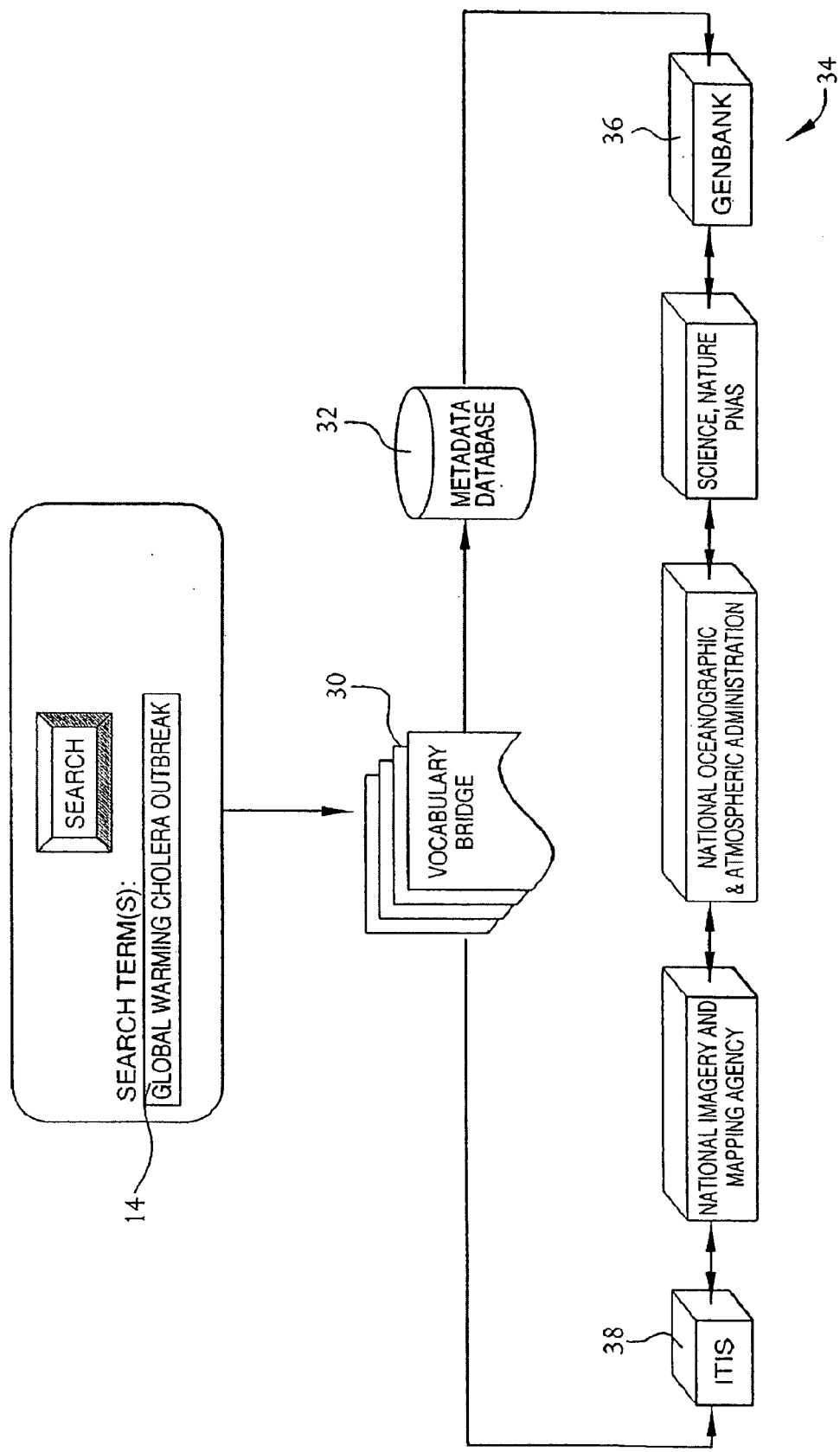
FIG. 3 shows a portion of the access page wherein a user has entered a natural language search along with a diagram illustrating a vocabulary bridge, a metadata database and a sampling of the types of databases that may be searched in order to obtain relevant information based on a query expanded by the vocabulary bridge, in accordance with an embodiment of the present invention.

Upon entering a query and clicking on the search button, the process of obtaining comprehensive search results will commence. As previously indicated, the query goes through a resolution process to eliminate extraneous terms and punctuation. The key terms of the query are then processed and expanded by the network. In one embodiment, the network includes a vocabulary bridge to expand a query entered by a user. Referring to FIG. 3, the vocabulary bridge 30 and metadata database 32 (both of which are explained in more detail hereinafter) are used to expand the query and obtain relevant information from the available databases. In FIG. 3, the available databases, which may be remote or local, are indicated generally by reference numeral 34. Any number of databases may be made available and particular databases may be made available, for example, according to the type of search being performed. Furthermore, it should be noted that the network node or access page may serve as the interface between the user and the available databases. That is, available databases may be automatically searched from the network node or access page of the present invention regardless of whether an available database has its own user interface.

Users may also be given the option of choosing the databases in which they would like to search. For instance, a user searching only for biological sequences may choose to search a database such as GenBank 36, for example, and none of the others. A user searching for information related to scientific classifications or other taxonomic information may choose to search a database such as the Integrated Taxonomic Information System (ITIS) database 38, for example, and none of the others. Users may be given the ability to choose various options including whether they want to control which databases are searched by providing, for example, an "advanced search" icon.

Figure 4:
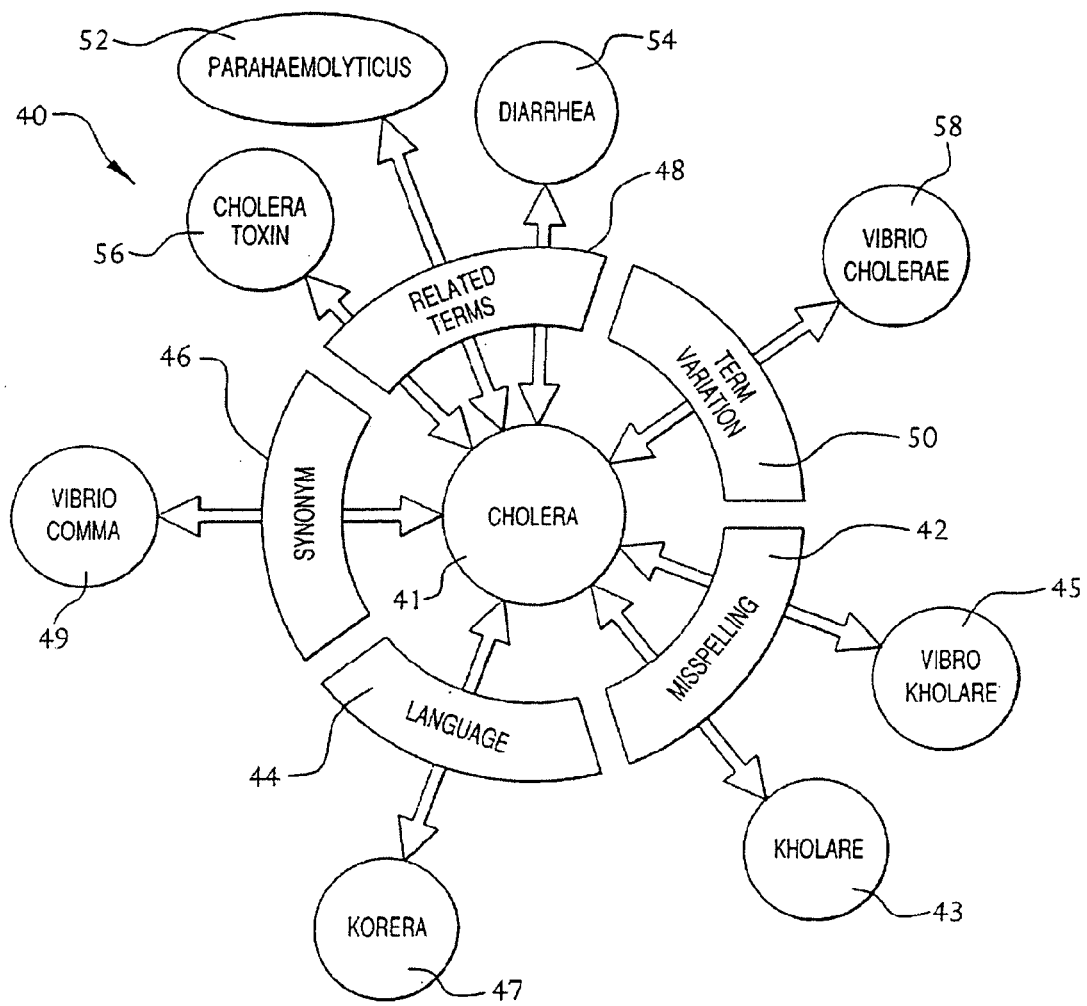
FIG. 4 is a diagram illustrating how a term contained in a query entered by a user may be expanded to include related or associated terms in order to increase the breadth of the search and obtain comprehensive search results, in accordance with an embodiment of the present invention.

Referring now to FIG. 4, an exemplary diagram of the vocabulary bridge is shown and indicated generally by reference numeral 40. The vocabulary bridge 40 is the component of the present invention which causes the query entered by the user to be expanded. As mentioned, the vocabulary bridge 40 may expand individual key terms of a query in a limitless number of ways. By way of example, the diagram in FIG. 4 provides five ways in which a term may be expanded. In FIG. 4, a particular resolver is shown for each way a query may be expanded. The misspelling resolver 42 may be used to correct misspelled words entered by the user and may also be used, if desired, to search the available databases for information that includes common misspellings of the entered term. For example, common misspellings of cholera 41 include kholare 43 and vibro kholare 45. The system therefore may be adapted to automatically recognize kholare 43 and vibro kholare 45 as cholera 41 if those common misspellings are inadvertently entered by a user attempting to search cholera 41. Additionally, the system may be adapted to search the available databases for those common misspellings of the term cholera 41. That is, when a user enters cholera 41, the terms kholare 43 and vibro knolare 45 may also be searched in order to identify information that was inadvertently made electronically available while containing those misspellings.

Language resolver 44 may be used to search for information written in a language other than the language that was used to enter the query. For example, the term cholera 41 is korera 47 in Japanese. The language resolver enables the system, upon receiving a query containing the term cholera 41, to search for information that contains the term korera 47. Therefore, a user who enters a query using the English language may have the query expanded by the language resolver 44 to search for relevant information in languages other than English. The language resolver, like all the resolvers, may also share data with other resolvers so that unentered terms added by one resolver may be further expanded by another resolver. For example, if synonym resolver 46 expands upon a query so that a query containing the term cholera 41, for example, is expanded to include the term vibrio comma 49, that information may be shared with the language resolver 44 so that the language resolver 44 may further expand the query to include various foreign language equivalents of vibrio comma 49.

The synonym resolver 46, as the name implies, may expand a query entered by a user by expanding the query so that it contains one or more synonyms of one or more terms originally entered by the user. There is no limit to the number of synonyms that may be added to a query, other than the number of synonyms a particular terms actually has. Often, a particular term may have one or more synonyms that may or may not be relevant to the context in which the entered term is being used. Therefore, if desired, specific limitations may be put into effect to ensure that the synonyms included in a query are consistent with the subject being searched.

The vocabulary bridge also includes a related-term resolver 48. The related-term resolver 48 may also be referred to as an associated-term resolver. The related-term resolver 48 is used to expand on the entered terms of a particular query so that the query may be expanded to include unentered terms related or associated to the entered terms. The unentered terms that may be added to a query through the related-term resolver 48 are terms pre-determined to be related to the terms entered by the user, keeping in mind the particular subject that is being searched. That is, where the system is biology-centric, the relationship between entered terms and unentered terms will be biological in nature.

To provide an example of how the related-term resolver may be configured to add unentered terms to an expanded query, reference is again made to FIG. 4 and the term cholera 41. Cholera 41 is a human pathogen that may cause various symptoms including diarrhea. Therefore, to provide a comprehensive search of the term cholera 41, a query containing the term cholera 41 may be expanded to include other unentered terms related to those subjects. Parahaemolyticus 52, for example, is also a pathogen of humans that shares some similarities to cholera 41 and therefore may be of interest to a searcher searching for information on cholera 41. Accordingly, the related-term resolver 48 may be programmed or otherwise adapted to expand a query containing the term cholera 41 by adding the term parahaemolyticus 52 to the query. Again, it is important to note that once a term has been added by one resolver, it may be further expanded by the other resolvers. Moreover, a search result retrieved as a result of expanding the query to include parahaemolyticus 52 may include, in its synopsis, details regarding the similarities and differences of parahaemolyticus 52 and cholera 41. For example, the synopsis of a item of information retrieved as a result of expanding the query to include parahaemolyticus 52 may explain that both cholera 41 and parahaemolyticus 52 cause diarrhea, but in ways that are entirely different. The synopsis may go on to explain that parahaemolyticus 52 is an invasive organism affecting primarily the colon while cholera 41 is noninvasive, affecting the small intestine through secretion of an enterotoxin. Such a synopsis enables a user to quickly determine whether further review of that item of information is required. The related-term resolver 48, in similar fashion to that described in the preceding paragraph, may also be expanded to include diarrhea 54 and cholera toxin 56. Diarrhea 54, as mentioned, is a symptom caused by cholera 41 and cholera toxin 56 is a toxin produced by cholera 41. The related-term resolver 48 may be programmed to include any number of unentered terms, as desired.

Often, terms used within a particular field include a number of variations. To efficiently handle that phenomenon and further enhance the ability to provide comprehensive search results, a term variation resolver 50 may be provided. The term variation resolver 50 may be adapted to include accepted or commonly used variations of particular terms. For example, the term cholera 41 is often referred to by its formal or full name of vibrio cholerae 58. Accordingly, the term variation resolver 50 may be adapted so that the vocabulary bridge may expand a query containing the term cholera 41 to also include the term vibrio cholerae 58. The term variation resolver 50 is the final exemplary resolver included in the exemplary diagram of the vocabulary bridge 40 shown in FIG. 4. However, the vocabulary bridge 40 may include any number of resolvers as desired in order to maximize a system's ability to properly expand a query and consequently provide a comprehensive set of relevant search results.

To facilitate query expansion, the vocabulary bridge may be adapted to draw on various electronic files for relating or associating terms together so as to expand a query. For example, the vocabulary bridge may be adapted to use electronic files such as dictionaries and thesauri so that a query may be expanded to include relatively simple relationships such as synonyms, misspellings and language variations. However, higher order relationships and associations must be predetermined in accordance with a standardized process for grouping various terms together based on, for example, the fact that two organisms may cause similar symptoms in humans or exist in similar parts of the world. The various relationships between terms, higher order or otherwise, are limitless and are created taking into account the body of information that is available for searching. A network of the present invention associated with biological information will group terms together from a biological perspective while a network associated with another body of information will include terms grouped together taking in account that particular body of information.

The vocabulary bridge may be adapted to make higher order associations through the use of authority files. Authority files include groups of related terms in order to provide the vocabulary bridge with instructions as to which terms are related, as pre-determined according to a standardized process, and which ones are not. That is, if a key term entered by a user is identified in an authority file as being related to another term or group of terms, the query will be expanded to include those other term(s). Typically, the authority files will contain groups of terms wherein all of the terms in a particular group are pre-determined as being related to each other. If a term entered by a user as part of a query is contained in one of the groups, the query will be expanded to include the other terms contained in that group thereby causing the query to include both entered and unentered terms. The various term relationships or groupings are pre-determined and created in order to provide the ability to search for information that may or may not include the actual terms entered by the user, but is nevertheless related thereto. Referring back to the example where a user entered the term malaria as part of a query where the query containing malaria was expanded to include malaria's causative agent. The relationship between malaria and its causative agent is identified in an authority file so that the related term resolver of the vocabulary bridge can make the association between malaria (entered term) and its causative agent (unentered term). Once an association between terms has been made the query is expanded to include malaria's causative agent. Various statistical models may be used in creating the authority files so as to provide consistent or standardized instructions to the vocabulary bridge regarding which terms should be added to a query in light of the query's entered terms.

Figure 5:
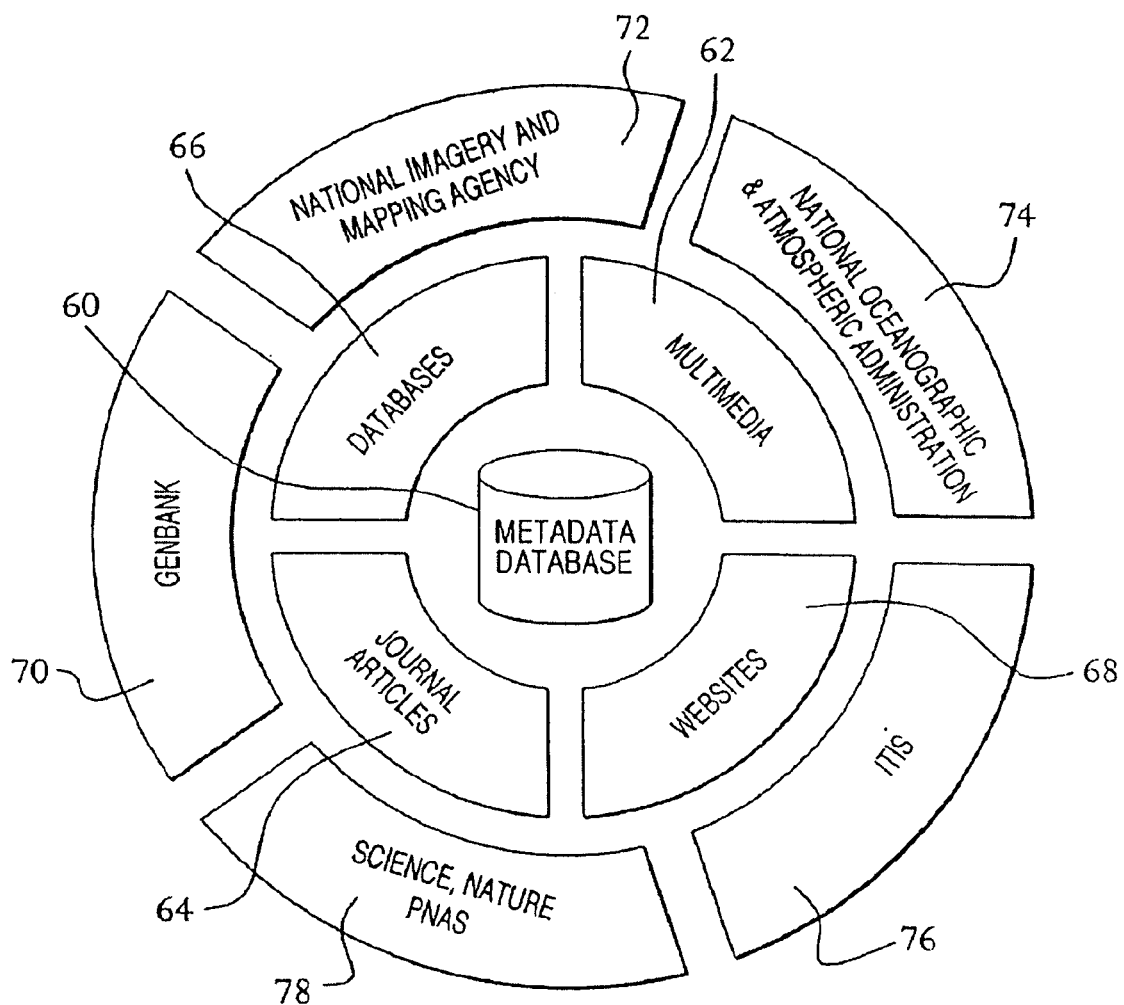
FIG. 5 is a diagram illustrating the various types of databases and information that may be accessed using the data contained in a metadata database, in accordance with an embodiment of the present invention.

Referring now to FIG. 5, there is shown a diagram of a metadata database 60. The metadata database 60 contains data for retrieving electronic files, and the information contained therein, that are identified as relevant by the system based on the query entered by the user and expanded by the vocabulary bridge. The metadata database 60 may include data for retrieving any type of information wherever it may be electronically or otherwise available. For example, the metadata database 60 may include data for retrieving all types of multimedia files 62 as well as text-based information such as journal articles 64 from various sources such as external or internal databases 66 and websites 68. Examples of the sources that may be searched to retrieve biology-centric information are also shown in FIG. 5. The exemplary sources include GenBank 70 which contains an annotated collection of all publicly available deoxyribonucleic acid (DNA) sequences, the National Imagery and Mapping Agency (NIMA) 72, the National Oceanographic & Atmospheric Administration 74, the Integrated Taxonomic Information System (ITIS) 76, and the Proceedings of the National Academy of Sciences (PNAS) 78. Again, it is important to note that the sources shown and described are mere examples to illustrate how the present invention works. Any type and number of sources may be made available to users for searching through the network's network node or access page.

Figure 6:
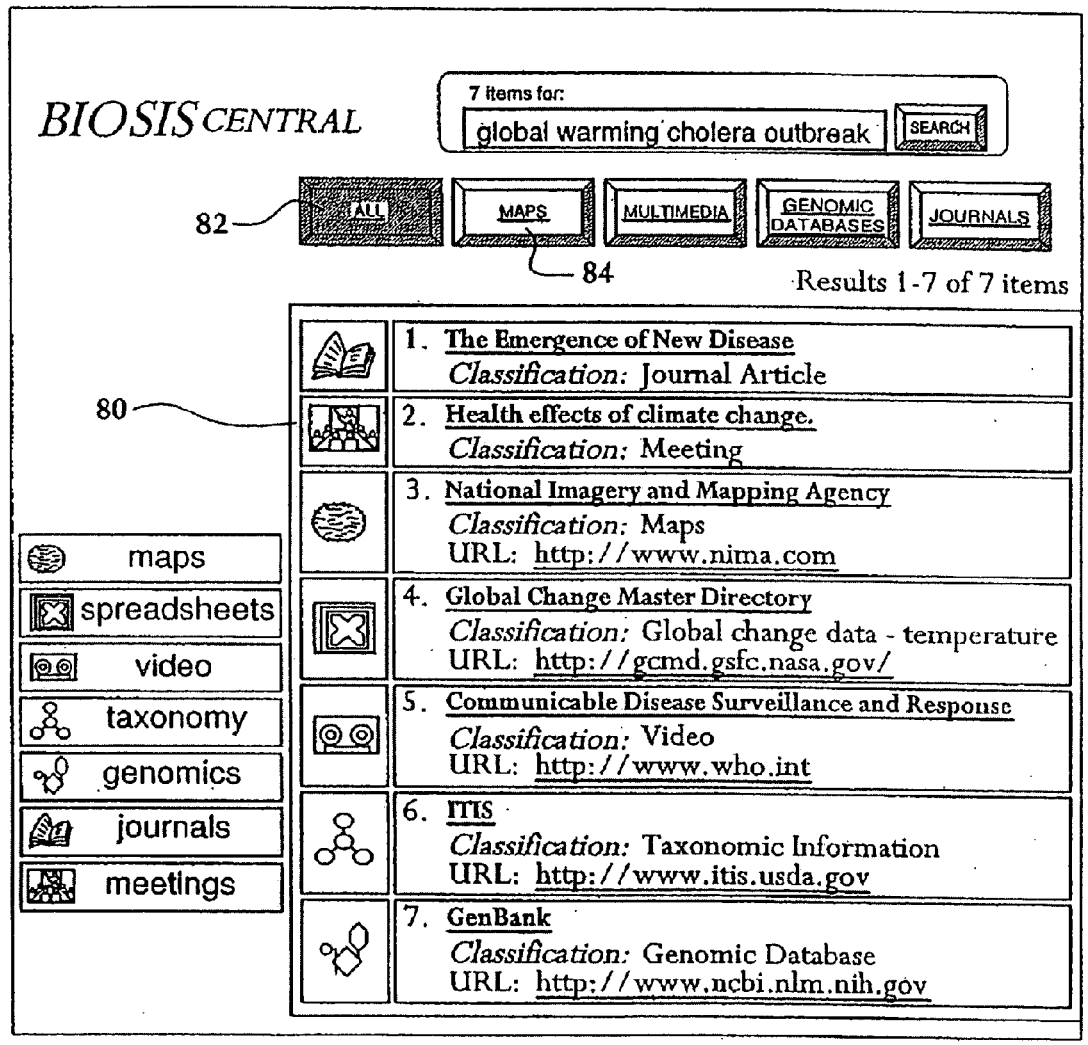
FIG. 6 is a page users may encounter while accessing the network showing a list of results wherein the list of results comprises information identified as being relevant to the user's query, in accordance with an embodiment of the present invention.

Once a query has been entered and expanded and certain information is identified as potentially relevant, a list of that information 80 may be provided as shown in FIG. 6. In the embodiment shown in FIG. 6, a user may select the various types of information that is displayed as part of a results list. In FIG. 6, the "all" button 82 is shown selected so that all types of information identified as potentially relevant is displayed. However, a user interested in only geographical information, for example, may select the "maps" button 84. Other available information may be selectively displayed in like fashion. As previously mentioned, a synopsis of each item of identified information may be provided as part of the results list. Once the results list is presented, the user is free to select any item of information identified as part of the list. When the user selects a particular item of information, it is retrieved and displayed.

Figure 7:
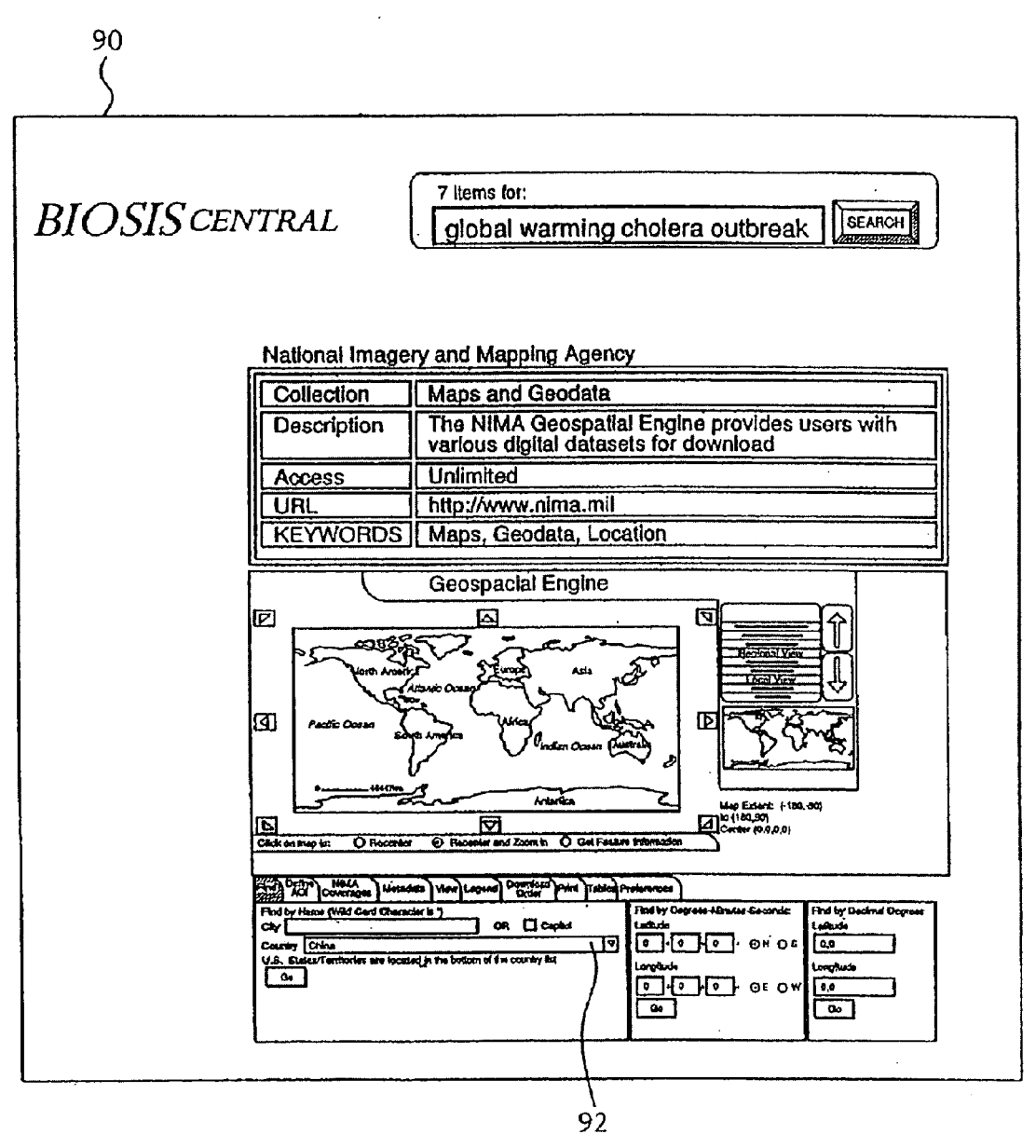

Referring now to FIG. 7 and assuming the user has selected the third item of information shown in FIG. 6, a screen 90, displaying an electronic file retrieved from the National Imagery and Mapping Agency database, is shown. That database is made available to users so as to provide electronic files comprising maps and geospatial data related to the user's query, such as the item of information listed as item number 3 in FIG. 6 and displayed in FIG. 7. Assuming China is associated with cholera or another term, entered or unentered, of the expanded query, China is placed in the country box 92 so that the user may obtain further information about that country. The user may go back to the results list shown in FIG. 6 at any time in order to peruse other relevant information as desired. That is, a user who wants to see a biological sequence such as a DNA sequence of cholera may return to the results list shown in FIG. 6 and select item number 7.

Figure 8:
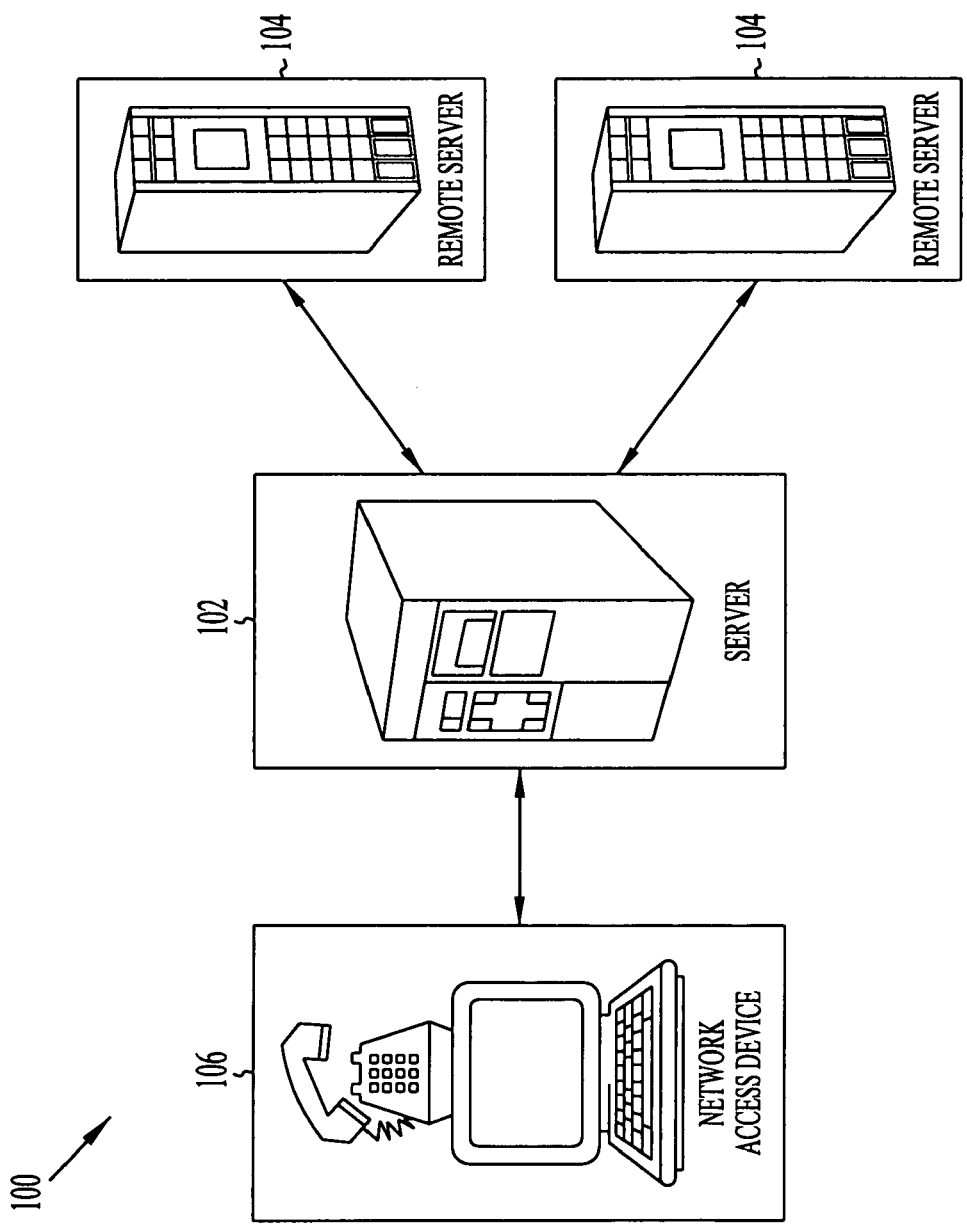
FIG. 8 is a diagram of the components of a system for providing users with comprehensive search results, in accordance with an embodiment of the present invention.

The system of the present invention, shown in FIG. 8, for providing users with comprehensive search results, comprises, in one embodiment, a computer network 100 that includes at least one server 102 for providing access to information. The computer network 100 is associated with a vocabulary bridge, a plurality of electronic files, and a metadata database for selectively retrieving the electronic files, as previously illustrated and described. In one embodiment, the vocabulary bridge, electronic files and metadata database may be associated with the network through the use of server 102. The electronic files and their metadata may also be available from any number of remote servers 104 as can information used by the vocabulary bridge to relate various terms together. The electronic files contained in server 102 and remote servers 104 may be accessed through the computer network 100, as desired. The computer network 100, as previously described, may be accessed using any device capable of establishing a communications link with a server. In FIG. 8, a standard personal computer 106 having a modem connected to a phone line is shown.

The electronic files associated with the network, and therefore available for searching, may be any type of file as previously explained. The vocabulary bridge includes authority files, dictionaries and thesauri for relating or grouping various terms together so that a query may be expanded as previously explained.

The present invention may be embodied in other specific forms without departing from the spirit or essential attributes thereof.

What is claimed is:

1. A computer-implemented method for providing a user with search results in response to queries entered by the user, comprising:

a) providing a plurality of electronic files containing information and a metadata database comprising identifying data for selectively accessing the electronic files;

b) prompting a user to enter a query;

c) identifying key texts contained in the query;

d) creating an expanded query to include additional terms related to the key terms in the query, with the additional terms including at least one term that is not synonymous with any identified key term, wherein the query is expanded to include a biological sequence of at least one term contained in the query and wherein creating the expanded query comprises:

providing a vocabulary bridge having electronic files including groups of terms for expanding a query entered by the user;

comparing key terms entered by the user as part of the query to the electronic files; and adding to the query all terms in at least one group that contains at least one of the key terms to provide an expanded query containing both entered terms and unentered terms;

e) identifying information that includes at least one of the terms in the expanded query;

f) prompting the user to select at least one item of information identified as including at least one of the terms in the expanded query; and g) accessing an electronic file that contains the information selected by the user.

2. The method of claim 1 wherein the electronic files include dictionaries, thesauri, and authority files.

3. The method of claim 1 wherein all of the terms contained within each individual group of terms are predetermined to be related to each other.

4. The method of claim 1 wherein the query is expanded to include an identifier identifying a biological sequence of at least one term contained in the query.

5. The method of claim 1 wherein the query is expanded to include at least one linguistical translation of at least one term contained in the query.

6. The method of claim 1 wherein the query is expanded to include at least one term associated with at least one term contained in the query.

7. The method of claim 1 wherein the plurality of electronic files are all related to a preselected subject.

8. The method of claim 7 wherein the preselected subject is biology.

9. The method of claim 1 comprising assigning identifying information to the user to enable the user to subsequently access and manipulate the query and the selected information.

10. The method of claim 1 comprising displaying to the user a synopsis of information identified as including at least one of the terms in the expanded query.

11. The method of claim 1, wherein the expanded query includes one or more first non-user-input terms based on one or more of the key terms and one or more second non-user-input terms based on one or more of the first non-user-input terms.

12. The method of claim 1, wherein the expanded query includes one or more first non-user-input terms based on one or more of the key terms, with one or more of the first non-user-input terms having a subject-matter-relationship with at least one of the key terms.

13. The method of claim 1, wherein identifying information that includes at least one of the terms in the expanded query includes:

presenting search results identifying a plurality of files having a plurality of file types;

wherein presenting the search results includes displaying at least a portion of the results within a graphical user interface having a plurality of user-selectable controls, with each control associated with a corresponding different file type and selectable to restrict display to a portion of the results having the corresponding different file type.

14. The method of claim 1, wherein all terms in the one group are related to a predetermined subject matter.

15. The method of claim 1, wherein at least one of the additional terms is:

a misspelled version of one of the user-input terms;

a linguistic variation of one of the user-input terms; or related by subject matter classification to at least one of the key terms.

16. The method of claim 1, wherein at least one of the additional terms and at least one of the key terms have a causal semantic relationship.

17. The method of claim 16, wherein at least one of the additional terms identifies a first biological condition caused by a second biological condition identified by at least one of the key terms.

18. The method of claim 16, wherein at least one of the additional terms identifies at least one cause of an effect identified by at least one of the key terms.

19. The method of claim 1, wherein prompting the user to select at least one item of information that includes one of the terms in the expanded query, includes presenting information regarding similarity or differences regarding information in a file including one of the key terms and information in a file including at least one of the additional terms.

20. The method of claim 1:

wherein identifying information that includes at least one of the terms in the expanded query includes identifying a plurality of files having a plurality of different file types; and wherein prompting the user to select at least one of item of information that includes one of the terms in the expanded query, includes displaying at least a portion of the identified information in a graphical user interface having a plurality of user-selectable controls, with each control associated with a corresponding one of the different file types and selectable to restrict display to a portion of the identified information having the corresponding one of the different file types.

21. The method of claim 20, wherein the plurality of file types includes a map type or a genomics type, and the plurality of user-selectable controls includes a control for restricting display to files of the map type and a control for restricting display to files of the genomics type.

22. The method of claim 20, wherein the plurality of file types includes a genomics type and a non-genomics type, and the plurality of user-selectable controls includes a control for restricting display to files of the genomics type.

23. The method of claim 1, wherein creating the expanded query to include additional terms related to the key terms, includes:

identifying one or more first terms based on one or more of the key terms; and subsequently and automatically identifying one or more second terms based on one or more of the first terms.

24. The method of claim 23, wherein creating the expanded query to include additional terms related to the key terms, further includes eliminating extraneous terms and punctuation from the entered query.

25. The method of claim 23, wherein each of the first terms has a subject-matter-relationship with at least one of the key terms.

26. A method of enabling a user using a computer network to obtain search results, comprising:

a) accessing a computer network associated with a plurality of electronic files containing information and a metadata database comprising identifying data for selectively accessing the electronic files;

b) identifying key terms contained in a query entered by a user over the computer network;

c) creating an expanded query to include additional terms associated with the key terms, with the additional terms including at least one term that is not synonymous with any identified key term and an identifier identifying a biological sequence of at least one term contained in the query, and wherein creating the expanded query comprises:

providing a vocabulary bridge having electronic files including groups of terms for expanding a query entered by the user;

comparing key terms entered by the user as part of the query to the electronic files; and adding to the query all terms in at least one group that contains at least one of the key terms to provide an expanded query containing both entered terms and unentered terms;

d) identifying information identified by at least one of the terms in the expanded query;

e) enabling the user to select at least one item of information identified by at least one of the terms in the expanded query; and f) accessing an electronic file that contains the information selected by the user.

27. The method of claim 26 wherein the plurality of electronic files include audio elements capable of being transmitted over a computer network.

28. The method of claim 26 wherein the plurality of electronic files include video elements capable of being transmitted over a computer network.

29. The method of claim 26 wherein the electronic files include dictionaries, thesauri, and authority files.

30. The method of claim 26 wherein all of the terms contained within each individual group of terms are predetermined to be related to each other.

31. The method of claim 26 wherein the query is expanded to include a biological sequence of at least one term contained in the query.

32. The method of claim 26 wherein the query is expanded to include at least one linguistical translation of at least one term contained in the query.

33. The method of claim 26 wherein the query is expanded to include at least one term that has been predetermined to be related to at least one term contained in the query.

34. The method of claim 26 wherein the plurality of electronic files are all related to a preselected subject.

35. The method of claim 34 wherein the preselected subject is biology.

36. The method of claim 26 comprising assigning identifying information to the user to enable the user to subsequently access and manipulate the query and the selected information.

37. The method of claim 26 comprising displaying to the user a synopsis of information identified by at least one of the terms in the expended query.

38. The method of claim 26:

wherein identifying information identified by at least one of the terms in the expanded query, includes identifying a plurality of files having a plurality of file types; and wherein enabling the user to select at least one item of information identified by at least one of the terms in the expanded query, includes displaying a graphical user interface having a plurality of user-selectable controls, with each control associated with a corresponding different file type and selectable to restrict display to a portion of the identified files having the corresponding different file type.

39. The method of claim 26, wherein the additional terms include:

at least one term that is a misspelled version of one of the key terms;

at least one term that is a linguistic variation of one of the key terms; or at least one term that is related by subject matter classification of one of the key terms.

40. The method of claim 26, wherein at least one of the additional terms and at least one of the key terms have a causal semantic relationship.

41. The method of claim 26, wherein the one of the additional terms identifies a first biological condition caused by a second biological condition identified by at least one of the key terms.

42. The method of claim 26, wherein the one of the additional terms identifies at least one cause of an effect identified by at least one of the key terms.

43. A computer system for providing users with search results in response to a query entered by the user, comprising:

a) an electronically accessible computer network including at least one server for providing access to information available through the computer network; and b) the computer network being associated with a plurality of electronic files containing information;

a metadata database for accessing the electronic files; and a vocabulary bridge for expanding a query entered by a user to define an expanded query, with the query including one or more user-entered key terms and the expanded query including at least one non-user-entered term that is not synonymous with any of the user-entered key terms and an identifier identifying a biological sequence of at least one term contained in the query, and wherein the vocabulary bridge comprises:

electronic files that include groups of terms for expanding a query entered by a user;

means for comparing key terms entered by the user as part of the query to the electronic files; and means for adding to the query all terms in at least one group that contains at least one of the key terms to provide an expanded query containing both entered terms and unentered terms.

44. A system as in claim 43 wherein the electronic files include dictionaries, thesauri, and authority files.

45. A system as in claim 44 wherein the authority files include groups of related terms for expanding a query entered by a user to include unentered terms relevant to entered terms.

46. A system as in claim 43 wherein all of the terms contained within each individual group of terms are predetermined to be related to each other.

47. A system as in claim 43 wherein the computer network is accessed using a personal computer.

48. The system as in claim 43, wherein the vocabulary bridge expands the query to include one or more first non-user-input terms based on one or more of the key terms and one or more second non-user-input terms based on one or more of the first non-user-input terms.

49. A system as in claim 43, wherein the server is configured to at least partially define a graphical user interface on an access device associated with the user, the interface comprising: a plurality of user-selectable controls, including at least one control for submitting the query and a plurality of result controls for controlling display of search results determined for the expanded query, with each result control associated with a corresponding different file type and selectable to restrict display of search results to its corresponding different file type.

50. The system of claim 49, wherein the plurality of result controls includes a control for restricting display of results to files of a map type and a control for restricting display of results to files of a genomics type.

51. The system of claim 49, wherein the plurality of file types includes a genomics type and a non-genomics type, and the plurality of user-selectable controls includes a control for restricting display of results to files of the genomics type.

52. The system of claim 49, wherein the plurality of result controls includes respective controls for restricting display of results to files of a map type, a multimedia type, a genomic type, and a journal type.

* * * * *

UNITED STATES PATENT AND TRADEMARK OFFICE
CERTIFICATE OF CORRECTION

PATENT NO.        : 7,139,755 B2  Page 1 of 1
APPLICATION NO.   : 09/992979
DATED             : November 21, 2006
INVENTOR(S)       : Hammond It is certified that error appears in the above-identified patent and that said Letters Patent is hereby corrected as shown below:

Title Page; On page 2, in field (56), under "Other Publications", in column 1, line 2, delete "canned_serch" and insert -- canned_search --, therefor.

In column 10, line 60, in Claim 1, delete "texts" and insert -- terms --, therefor.

Signed and Sealed this

Fifth Day of June, 2007

JON W. DUDAS
*Director of the United States Patent and Trademark Office*